(12) United States Patent
Kaltenbach et al.

(10) Patent No.: US 12,508,892 B2
(45) Date of Patent: Dec. 30, 2025

(54) MOTOR VEHICLE TRANSMISSION FOR AN AT LEAST PARTIALLY ELECTRICALLY DRIVEN MOTOR VEHICLE

(71) Applicant: ZF Friedrichshafen AG, Friedrichshafen (DE)

(72) Inventors: Johannes Kaltenbach, Friedrichshafen (DE); Thomas Martin, Weissensberg (DE); Fabian Kutter, Kressbronn (DE); Kai Bornträger, Langenargen (DE); Johannes Glückler, Friedrichshafen (DE); Stefan Renner, Bodman-Ludwigshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 18/626,791

(22) Filed: Apr. 4, 2024

(65) Prior Publication Data
US 2024/0336125 A1    Oct. 10, 2024

(30) Foreign Application Priority Data

Apr. 4, 2023 (DE) ................ 10 2023 203 097.7

(51) Int. Cl.
*F16H 3/66* (2006.01)
*B60K 6/365* (2007.10)
(Continued)

(52) U.S. Cl.
CPC ...... *B60K 6/365* (2013.01); *B60K 2006/4816* (2013.01); *B60K 17/16* (2013.01);
(Continued)

(58) Field of Classification Search
CPC ....... F16H 2200/2097; F16H 2003/442; F16H 3/66; F16H 2200/201; B60K 1/00–02;
(Continued)

(56) References Cited

U.S. PATENT DOCUMENTS

| 11,668,380 B2 | 6/2023 | Renner |
| 2015/0219193 A1* | 8/2015 | Nitsch .................. F16H 37/046 |
| | | 475/219 |

(Continued)

FOREIGN PATENT DOCUMENTS

| DE | 10 2012 025 369 A1 | 7/2014 |
| DE | 10 2014 006 132 A1 | 6/2015 |

(Continued)

OTHER PUBLICATIONS

Definition of "engine" from https://dictionary.cambridge.org/dictionary/english/engine (Year: 2025).*

(Continued)

*Primary Examiner* — Ernesto A Suarez
*Assistant Examiner* — Lillian T Nguyen
(74) *Attorney, Agent, or Firm* — Finch & Maloney PLLC

(57) ABSTRACT

A motor vehicle transmission (3) includes a drive shaft (6), an output shaft (7), and a first planetary gear set (P1), a second planetary gear set (P2), and a third planetary gear set (P3). The drive shaft (6) is provided for coupling to at least one drive engine. The first planetary gear set (P1) is positioned axially at least overlapping with the second planetary gear set (P2) and is arranged radially on the inside of the second planetary gear set (P2). Furthermore, a shift element (A) is provided at least functionally. The invention also relates to a drive unit (1), an electrically drivable motor vehicle drive axle, a hybrid or electric vehicle and a method for operating a motor vehicle transmission.

20 Claims, 7 Drawing Sheets

(51) Int. Cl.
  *B60K 6/48* (2007.10)
  *B60K 17/16* (2006.01)
  *F16H 3/44* (2006.01)

(52) U.S. Cl.
  CPC ........ *F16H 2003/442* (2013.01); *F16H 3/666* (2013.01); *F16H 2200/2007* (2013.01); *F16H 2200/201* (2013.01); *F16H 2200/2097* (2013.01)

(58) Field of Classification Search
  CPC .. B60K 6/365; B60K 2001/001; B60K 6/547; B60K 17/046; B60K 17/16
  See application file for complete search history.

(56) References Cited

U.S. PATENT DOCUMENTS

| | | | |
|---|---|---|---|
| 2016/0017961 A1* | 1/2016 | Beck | ........................ F16H 3/666 475/277 |
| 2016/0040768 A1* | 2/2016 | Beck | ..................... F16H 37/042 475/275 |
| 2017/0158041 A1 | 6/2017 | Ohnemus et al. | |
| 2018/0328465 A1 | 11/2018 | Warth et al. | |
| 2020/0262293 A1 | 8/2020 | Glückler et al. | |
| 2023/0139069 A1 | 5/2023 | Rittler et al. | |

FOREIGN PATENT DOCUMENTS

| | | |
|---|---|---|
| DE | 10 2014 218 613 A1 | 3/2016 |
| DE | 10 2017 004 898 A1 | 11/2018 |
| DE | 10 2017 006 262 A1 | 1/2019 |
| DE | 10 2017 222 723 A1 | 6/2019 |
| DE | 102018000186 A1 * | 7/2019 |

OTHER PUBLICATIONS

German Patent Office, German Search Report issued in German patent application No. 10 2023 203 096.9 (Nov. 29, 2023).
German Patent Office, German Search Report issued in German patent application No. 10 2023 203 097.7 (Nov. 23, 2023).
United States Patent Office, Non-Final Office Action issued in U.S. Appl. No. 18/626,589 (mailed May 8, 2025).

* cited by examiner

|    | A | B | C |
|----|---|---|---|
| G1 | x |   |   |
| G2 |   | x |   |
| G3 |   |   | x |

Fig. 2

|   | A | C |
|---|---|---|
| G1 | x |   |
| G2' |   | x |

Fig. 4

|    | A | B |
|----|---|---|
| G1 | x |   |
| G2 |   | x |

Fig. 6

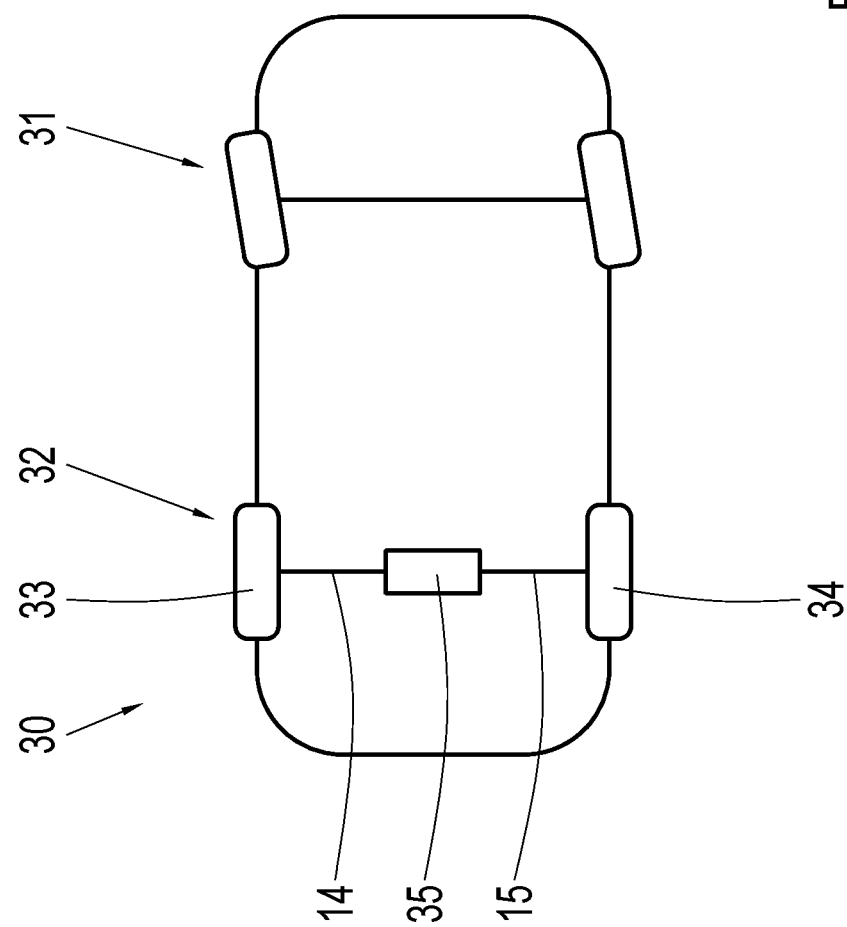

MOTOR VEHICLE TRANSMISSION FOR AN AT LEAST PARTIALLY ELECTRICALLY DRIVEN MOTOR VEHICLE

RELATED APPLICATIONS

This application claims the benefit of and right of priority under 35 U.S.C. § 119 to German Patent Application no. 10 2023 203 097.7, filed on 4 Apr. 2023, the contents of which are incorporated herein by reference in its entirety.

FIELD OF THE DISCLOSURE

The invention relates to a motor vehicle transmission for an at least partially electrically driven motor vehicle, in particular for an electrically drivable motor vehicle drive axle, comprising a drive shaft, an output shaft and a first planetary gear set, a second planetary gear set, and a third planetary gear set, the drive shaft being provided for coupling to at least one drive engine, the first planetary gear set, the second planetary gear set, and the third planetary gear set each having a first element, a second element, and a third element in the form of a sun gear, a planet carrier, and a ring gear, wherein the first planetary gear set is placed axially at least overlapping with the second planetary gear set and is arranged radially inside the second planetary gear set, wherein the first element of the first planetary gear set is non-rotatably connected to the drive shaft, wherein the third element of the first planetary gear set and the first element of the second planetary gear set are non-rotatably connected to one another, wherein the second element of the second planetary gear set is fixed, and wherein at least functionally a shift element is provided, in the actuated state of which the second element of the first planetary gear set and the third element of the second planetary gear set are non-rotatably connected to one another. Furthermore, the invention relates to a drive unit for an at least partially electrically driven motor vehicle, an electrically driven motor vehicle drive axle for an at least partially electrically driven motor vehicle, a hybrid or electric vehicle, and a method for operating a motor vehicle transmission.

BACKGROUND

In the case of motor vehicles designed as electric and hybrid vehicles, a motor vehicle transmission is sometimes provided in a respective drive train between at least one electric motor and the drive wheels of the respective motor vehicle in order to be able to translate a drive movement of the at least one electric motor, in particular to the drive wheels at low speed. In addition to single-speed transmissions, automotive transmissions are also used in some cases in which two or more gears can be shifted.

DE 10 2017 004 898 A1 shows a motor vehicle transmission that is intended for use in an electric vehicle. In addition to a drive shaft and an output shaft, this motor vehicle transmission comprises three planetary gear sets in one variant, each of which is made up of elements in the form of a sun gear, a planet carrier, and a ring gear. Two of these planetary gear sets are axially nested in one plane, in that one planetary gear set is positioned axially at the same height as the other planetary gear set and radially on the inside. The remaining planetary gear set functions as a differential gear set in the form of a planetary differential and can be coupled to the two upstream, nested planetary gear sets via the intermediate output shaft. When the vehicle transmission is installed, the drive shaft is used to connect to an upstream electric motor. In addition, the electric vehicle transmission has three shift elements that are designed as non-positive shift elements and whose selective actuation can be used to display different power flow paths from the drive shaft via the two nested planetary gear sets to the output shaft.

SUMMARY

Based on the state of the art described above, it is now the task of the present invention to create an axially compact motor vehicle transmission by means of which at least one drive engine can be integrated in a suitable manner.

This object is achieved by embodiments variously disclosed herein with the characterizing features. The present disclosure also relates to a motor vehicle transmission and a drive unit in which a motor vehicle transmission according to the invention is provided. The present disclosure also relates to an electrically driven motor vehicle drive axle for an at least partially electrically driven motor vehicle, and to a hybrid or electric vehicle. Finally, the present disclosure relates to a method for operating a motor vehicle transmission according to the invention.

According to the invention, a motor vehicle transmission comprises a drive shaft, an output shaft and a first planetary gear set, a second planetary gear set and a third planetary gear set. The drive shaft is intended for coupling with at least one drive engine. In addition, the first planetary gear set, the second planetary gear set, and the third planetary gear set each have a first element, a second element, and a third element in the form of a sun gear, a planet carrier, and a ring gear, wherein the first planetary gear set is placed axially at least overlapping with the second planetary gear set and is arranged radially on the inside of the second planetary gear set. The first element of the first planetary gear set is non-rotatably connected to the drive shaft, whereas the third element of the first planetary gear set and the first element of the second planetary gear set are non-rotatably connected to each other. Furthermore, the second element of the second planetary gear set is fixed, wherein at least functionally a shift element is provided, in the actuated state of which the second element of the first planetary gear set and the third element of the second planetary gear set are connected to each other in a rotationally fixed manner.

For the purposes of the invention, a respective "shaft", such as the drive shaft and the output shaft of the motor vehicle transmission according to the invention, is to be understood as a rotatable component of the motor vehicle transmission via which a force flow can be guided between components. The respective shaft can connect these components axially or radially or both axially and radially with each other in the case of force flow guidance. The respective shaft can also be present as an intermediate piece, via which a respective component is connected purely radially, for example. Furthermore, depending on the course and connection to the components, the respective shaft can be designed as a solid shaft, a hollow shaft or partly as a solid and partly as a hollow shaft. Alternatively, or additionally, the respective shaft can be designed in one or more parts.

For the purposes of the invention, "axial" means an orientation in the direction of a longitudinal central axis of the motor vehicle transmission, parallel to which axes of rotation of shafts of the motor vehicle transmission and the elements of the planetary gear sets are also oriented. The term "radial" then refers to an orientation in the diameter direction of a respective component of the transmission, in particular a respective shaft or a respective element of the planetary gear sets.

The motor vehicle transmission according to the invention has a drive shaft which, in the motor vehicle transmission according to the invention, is provided for producing a drive-side coupling to at least one drive engine, the drive shaft preferably being used for coupling to precisely one drive engine. For this purpose, the drive shaft is equipped in particular with a connection point at which the drive shaft can be coupled to the at least one drive engine. The connection of the at least one drive engine to the connection point of the drive shaft is made permanently when the vehicle transmission is installed, preferably if the drive machine is designed as a drive engine. Alternatively, an intermediate starting element, such as a hydrodynamic torque converter, a starting clutch, etc., can also be provided, via which the drive shaft can be or is coupled to the upstream drive engine at its connection point. This is realized in particular when the drive engine is designed as an internal combustion engine.

The coupling between the at least one drive engine and the drive shaft is preferably in the form that, in the installed state of the motor vehicle transmission and with the coupling established, a fixed speed ratio always prevails between a speed of the drive shaft of the motor vehicle transmission and a speed of the drive engine. Thus, within the scope of the invention, at least one further transmission stage, such as a spur gear stage and/or a planetary stage, may be provided between the drive shaft and the drive engine, via which a pre-transmission of a rotary movement of the drive engine to the drive shaft can be represented. However, the drive shaft is preferably used for a torsionally rigid connection with the at least one drive engine.

The vehicle transmission is in particular a hybrid or electric vehicle transmission, which is intended to be connected to a drive engine in the form of an electric machine on the drive shaft. As described above, a rotor of the electric motor can be coupled to the drive shaft of the gearbox via at least one intermediate transmission stage. However, a rotor of the electric motor in the installed state of the motor vehicle transmission according to the invention is particularly preferably connected to the drive shaft in a rotationally fixed manner.

In the motor vehicle transmission according to the invention, the output shaft is provided in particular for establishing an output-side coupling of the motor vehicle transmission to components which, in the installed state of the motor vehicle transmission, follow the motor vehicle transmission in the direction of force flow to the drive wheels of the respective motor vehicle.

In the motor vehicle transmission according to the invention, the drive shaft and the output shaft are arranged in particular coaxially to one another, wherein further preferably the first planetary gear set, the second planetary gear set, and the third planetary gear set are also each positioned coaxially to the drive shaft and the output shaft. This makes it possible to achieve a particularly compact design of the vehicle transmission in the radial direction.

The first planetary gear set, the second planetary gear set, and the third planetary gear set are each made up of a first element, a second element, and a third element, with one of these elements each being designed as a sun gear, one element each as a planet carrier, and one element each as a ring gear. The individual planetary gear set is preferably a minus planetary set in which the respective planet carrier rotatably supports at least one planet gear, wherein the at least one planet gear is in meshing engagement with both the respective sun gear and the respective ring gear. If the individual planetary gear set is designed as a minus planetary set, then the first element of the respective planetary gear set is the respective sun gear, the second element of the respective planetary gear set is the respective planet carrier, and the third element of the respective planetary gear set is the respective ring gear. In particular, several planetary gears are rotatably mounted in the respective planet carrier.

Alternatively, one or more of the planetary gear sets could also be designed as a plus planetary set. In this case, at least one pair of planet gears is rotatably mounted in the respective planet carrier, of which one planet gear meshes with the respective sun gear and one planet gear meshes with the respective ring gear. In addition, the planetary gears of the at least one planetary gear pair mesh with one another. In contrast to an embodiment as a minus planetary gear set, the first element of the respective planetary gear set is preferably the respective sun gear, the second element of the respective planetary gear set is the respective ring gear, and the third element of the respective planetary gear set is the respective planet carrier. In comparison to an embodiment as a minus planetary gear set, a stationary transmission ratio of the respective planetary gear set must also be increased by one. As already described above, however, the first planetary gear set, the second planetary gear set, and the third planetary gear set are preferably each a minus planetary set.

According to the invention, the first planetary gear set is positioned axially at least overlapping with the second planetary gear set, the first planetary gear set being arranged radially on the inside of the second planetary gear set. By "axially at least overlapping" is meant that at least one part of the first planetary gear set lies axially in one plane with at least one part of the second planetary gear set. Preferably, the first planetary gear set and the second planetary gear set overlap axially predominantly or even completely, whereby the first planetary gear set and the second planetary gear set are placed axially at least largely in a common plane. In combination with the radially inner arrangement of the first planetary gear set, this enables a nested arrangement of the two planetary gear sets and thus an axially short design.

For the purposes of the invention, a "rotationally fixed connection" of components of the transmission is to be understood as meaning that these components, which are connected to one another in a rotationally fixed manner or are connected to one another in a rotationally fixed manner, are rigidly connected to one another and thus always have the same rotational speed. The components that are non-rotatably connected or non-rotatably connected to each other can be separate components that are attached to each other. Alternatively, components that are non-rotatably connected or non-rotatably connected to each other can also be designed in one piece and are thus present together as one component, wherein this is realized in particular when these components are arranged close together.

In the present case, the first element of the first planetary gear set and the drive shaft are permanently connected to each other in a rotationally fixed manner, so that the first element of the first planetary gear set and the drive shaft always rotate together. Furthermore, the third element of the first planetary gear set is permanently connected to the first element of the second planetary gear set in a rotationally fixed manner, as a result of which the third element of the first planetary gear set and the first element of the second planetary gear set permanently have the same rotational speed. In addition, the second element of the second planetary gear set is fixed and is therefore constantly prevented from rotating.

In the context of the invention, a fixed state of a component of the motor vehicle transmission is realized in particular by a rotationally fixed connection with a permanently fixed component, which may be a housing of the motor vehicle transmission, a part of the housing or a component permanently connected thereto in a rotationally fixed manner. In the case of a permanently fixed state, the respective component could also be designed in one piece with the fixed component. In this case, the second element of the second planetary gear set could also be formed by a permanently fixed component.

The motor vehicle transmission according to the invention has at least functionally a first shift element, but preferably at least functionally several shift elements are provided. It is particularly preferable for the motor vehicle transmission according to the invention to have exactly two or exactly three shift elements, at least in terms of function.

The fact that a respective shift element is provided "at least functionally" means, in the sense of the invention, that at least the respective function of the respective shift element is represented in the motor vehicle transmission according to the invention. In the case of several shift elements, the shift elements may actually be physically present as individual shift elements or their function may be represented by another component, such as a shifting device. A component mapping the function can then combine the function of two or more shift elements in one device.

A representation of an actuated state of the at least functionally provided shift element has the consequence that the second element of the first planetary gear set and the third element of the second planetary gear set are connected to each other in a rotationally fixed manner.

In the context of the invention, an arrangement of an at least functionally provided shift element between two components means that these components are not permanently coupled to each other, but a coupling is only carried out by displaying an actuated state of the at least functionally provided, intermediate shift element. An actuated state of the at least functionally provided shift element within the meaning of the invention means that the relevant shift element is transferred to a closed state and subsequently adjusts the rotary movements of the components directly coupled thereto. If at least the function of a positive-locking shift element is mapped, the components directly connected to each other in a rotationally fixed manner will run at the same speed, whereas if at least the function of a non-positive-locking shift element is mapped, there may be differences in speed between the components even after an actuated state of the same has been mapped. This intentional or unintentional state is nevertheless referred to in the context of the invention as a rotationally fixed connection of the respective components via the at least functionally provided shift element.

The invention now comprises the technical teaching that the second element of the first planetary gear set and the first element of the third planetary gear set are non-rotatably connected to each other, while the second element of the third planetary gear set is non-rotatably connected to the output shaft. The third element of the third planetary gear set is also fixed. In other words, the second element of the first planetary gear set and the first element of the third planetary gear set are permanently connected to each other in a rotationally fixed manner and therefore always rotate together. There is also a permanent, non-rotatable connection between the second element of the third planetary gear set and the output shaft, which means that the second element of the third planetary gear set and the output shaft always have the same rotational speed. In addition, the third element of the third planetary gear set is permanently prevented from rotating in that the third element of the third planetary gear set is permanently fixed.

Such an embodiment of a motor vehicle transmission has the advantage that, due to the coupling of the three planetary gear sets with each other in accordance with the invention and when the actuated state of the at least functionally provided shift element is represented, a high transmission ratio can be realized, which is particularly suitable for the integration of a drive engine in the form of an electric machine. Due to the nested arrangement of the first planetary gear set and the second planetary gear set, this can be realized with axially compact installation space, so that overall a compact vehicle transmission with a high transmission ratio is achieved.

In this way, a first gear can be shifted between the drive shaft and the output shaft by displaying an actuated state of the shift element. This achieves a high transmission ratio from the drive shaft to the output shaft by rotating the third element of the first planetary gear set and the first element of the second planetary gear set in opposite directions.

According to one embodiment of the invention, a further shift element is also provided, at least functionally, in the actuated state of which the third element of the second planetary gear set is connected to the output shaft in a rotationally fixed manner. The representation of an actuated state of the further shift element therefore means that the third element of the second planetary gear set and the output shaft are connected to each other in a rotationally fixed manner. If, in the motor vehicle transmission according to the invention, only the further shift element is provided in addition to the shift element, at least in terms of function, a second gear can be represented by realizing the actuated state of the further shift element. As a result, the third element of the first planetary gear set and the first element of the second planetary gear set rotate in the same direction as in first gear, but at a lower speed.

If only the shift element and the further shift element are present in the motor vehicle transmission, the shift element and the further shift element are preferably formed by a common shift device which has a coupling element. The coupling element can be positioned in a first shift position and in a second shift position, wherein the coupling element in the first shift position functionally represents an actuated state of the shift element and connects the second element of the first planetary gear set and the third element of the second planetary gear set to each other in a rotationally fixed manner. In the second shift position, the coupling element functionally represents an actuated state of the other shift element and connects the third element of the second planetary gear set and the output shaft in a rotationally fixed manner. In this case, the function of the shift element and the additional shift element is therefore mapped by a shifting device, which enables a particularly compact arrangement. In addition, a positioning actuator can be provided for actuating the shift elements, via which the coupling element can be positioned in the different shift positions. Preferably, the coupling element can still be positioned in a neutral position between the shift positions, in which none of the actuated states of the associated shift elements are shown.

In particular, the coupling element of the shifting device is guided in a rotationally fixed manner and axially displaceable between the two shift positions on a first toothing, which is connected in a rotationally fixed manner to the third element of the second planetary gear set. In the first shift position, the coupling element of the shifting device engages in a second toothing, which is non-rotatably connected to the second element of the first planetary gear set and the first element of the third planetary gear set. On the other hand, in the second shift position, the coupling element of the shifting device engages with a third toothing, which is non-rotatably connected to the output shaft. In this case, the coupling element of the shifting device is therefore designed as a sliding sleeve, wherein the toothing is preferably designed as claw toothing, so that the function of unsynchronized claw shift elements is mapped via the shifting device. Within the scope of the invention, however, the shift element and the further shift element could also be present as individual shift elements, in which case the two shift elements are designed in particular as positive-locking shift elements and in this case particularly preferably as unsynchronized claw shift elements. Alternatively, an embodiment as locking synchronizations or as force-locking shift elements can also be considered, in particular as lamellar shift elements.

Alternatively, or in addition to the aforementioned embodiment, it is a possible embodiment of the invention that an additional shift element is also provided, at least functionally, in whose actuated state two of the elements of the second planetary gear set are connected to one another in a rotationally fixed manner. In this case, an additional shift element is therefore present, at least in terms of function, wherein when an actuated state of this additional shift element is displayed, a rotationally fixed connection is brought about between two of the elements of the second planetary gear set, thereby creating a blocking of the second planetary gear set. As the second element of the second planetary gear set is permanently fixed, this blocking of the second planetary gear set results in the complete second planetary gear set coming to a standstill.

Specifically, two of the elements of the second planetary gear set can be directly connected to each other in a rotationally fixed manner, i.e., the first element and the second element of the second planetary gear set, the first element and the third element of the second planetary gear set, or the second element and the third element of the second planetary gear set. However, a rotationally fixed connection of two of the elements of the second planetary gear set is also achieved by fixing one of the remaining elements next to the second element of the second planetary gear set in the actuated state of the additional shift element, i.e., either the first element of the second planetary gear set or the third element of the second planetary gear set. This is because, due to the permanently fixed state of the second element of the second planetary gear set, the second element of the second planetary gear set and the then fixed element of the second planetary gear set are also non-rotatably connected to each other.

If only the shift element and the additional shift element are provided in the motor vehicle transmission according to the invention, at least in terms of function, a second gear can be shifted between the drive shaft and the output shaft in addition to the first gear by representing an actuated state of the additional shift element. As a result, the second planetary gear set is blocked, as described above, so that the drive shaft is coupled to the output shaft via the first planetary gear set and the third planetary gear set.

It is a preferred variant of the aforementioned design option that the third element of the second planetary gear set is directly fixed in the actuated state of the at least functionally provided additional shift element. In a further development of this variant, the shift element and the additional shift element are then formed by a common shifting device, which has a coupling element. The coupling element can be positioned in a first shift position and in a second shift position, with the coupling element in the first shift position functionally representing an actuated state of the shift element and connecting the third element of the second planetary gear set to the second element of the first planetary gear set and the first element of the third planetary gear set in a rotationally fixed manner. In contrast, the coupling element in the second shift position functionally represents an actuated state of the additional shift element and fixes the third element of the second planetary gear set. This allows the function of the shift element and the additional shift element to be mapped by a shifting device and thus in a compact manner. A common positioning actuator is also required to display the actuated states, via which the coupling element can be positioned in the different shift positions. Preferably, the coupling element can still be positioned in a neutral position between the shift positions, in which none of the actuated states of the associated shift elements are shown.

The aforementioned shifting device is designed in particular in such a way that the coupling element of the shifting device is guided non-rotatably and axially displaceable between the two shift positions on a first toothing, which is non-rotatably connected to the third element of the second planetary gear set. In the first shift position, the coupling element then engages in a second toothing, which is non-rotatably connected to the second element of the first planetary gear set and the first element of the third planetary gear set. When transferred to the second shift position, the coupling element engages with a third toothing, which is permanently fixed. The coupling element of the shifting device is thus designed as a sliding sleeve, wherein the toothing is designed in particular as claw toothing, so that the function of unsynchronized claw shift elements is mapped via the shifting device. Alternatively, the shift element and the additional shift element could also be present as individual shift elements, wherein in this case the two shift elements are designed in particular as positive-locking shift elements and in this case particularly preferably as unsynchronized claw shift elements. Alternatively, individual shift elements could also be designed as locking synchronizations or as force-locking shift elements, in particular in the form of lamellar shift elements.

According to an advantageous embodiment of the invention, both the further shift element and the additional shift element are provided in the motor vehicle transmission, at least in terms of function, in addition to the shift element. This allows three different gears of the vehicle transmission to be realized, wherein a second gear can be shifted between the drive shaft and the output shaft following the first gear by representing an actuated state of the further shift element. A third gear is created between the drive shaft and the output shaft by realizing an actuated state of the additional shift element.

It is particularly advantageous if the shift element, the further shift element and the additional shift element are formed by a common shifting device which has a coupling element. Here, the coupling element can be positioned in a first shift position, in a second shift position, and in a third shift position, wherein the coupling element in the first shift position functionally represents an actuated state of the shift element and connects the third element of the second planetary gear set to the second element of the first planetary gear set and the first element of the third planetary gear set in a rotationally fixed manner. In the second shift position, the coupling element functionally represents an actuated state of the other shift element and connects the third element of the second planetary gear set and the output shaft in a rotationally fixed manner. In addition, the coupling element in the third shift position functionally represents an actuated state of the additional shift element and fixes the third element of the second planetary gear set. This allows a compact design to be realized by mapping the function of the three shift elements to a common shifting device. Accordingly, only one positioning actuator needs to be provided for displaying the actuated states of the shift elements, via which the coupling element can be positioned in the different shift positions. In particular, the coupling element can still be positioned in an intermediate neutral position between adjacent shift positions, in which none of the actuated states of the associated shift elements are shown.

Specifically, the coupling element of the aforementioned shifting device can be designed as a sliding sleeve, which is axially displaceable between the shift positions and is guided in a rotationally fixed manner on a first toothing, wherein this first toothing is connected in a rotationally fixed manner to the third element of the second planetary gear set. In the first shift position, the coupling element then engages in a second toothing, which is non-rotatably connected to the second element of the first planetary gear set and the first element of the third planetary gear set. When moving into the second shift position, the coupling element comes into meshing engagement with a third toothing, which is permanently connected to the output shaft so that it cannot rotate. Finally, in the third shift position, the coupling element engages in a fourth toothing, which is permanently fixed. The toothing is designed in particular as claw toothing, so that the function of unsynchronized claw shift elements is mapped via the shifting device. Alternatively, the shift elements could also be present as individual shift elements, wherein the shift elements in this case are designed in particular as positive-locking shift elements and in this case particularly preferably as unsynchronized claw shift elements. However, an embodiment as locking synchronizations or as force-locking shift elements is also possible, in particular as lamellar shift elements. Alternatively, two of the three at least functionally provided shift elements could be formed by a shifting device, while the remaining shift element is present as a single shift element.

In all the aforementioned variants, apart from the shifting of gears, it is also possible to display one neutral shift each, which in the case of a shifting device is realized by a respective neutral position of the respective coupling element and in the case of individual shift elements by the actuation of no shift element. In an advantageous way, this allows the at least one drive engine connected to the drive shaft to be decoupled. On the other hand, if the function of unsynchronized claw shift elements is mapped by the respective shifting device or the individual shift element to be actuated is present as an unsynchronized claw shift element, synchronization can be carried out in the respective neutral shift. If the drive engine connected to the drive shaft is designed as an electric machine, this synchronization process is preferably supported by the electric machine.

According to one possible embodiment of the invention, the third element of the first planetary gear set and the first element of the second planetary gear set are designed in one piece. This means that the two elements can be manufactured together with low production costs. In addition, a compact arrangement of both elements is possible here.

According to one embodiment of the invention, the output shaft is coupled to a differential gear set which couples the output shaft to two output shafts. The differential gear set functions in particular as a transverse differential and is preferably designed as a bevel gear differential. The transverse differential formed in this way is preferably used to distribute a drive movement transmitted to the output shaft of the motor vehicle transmission to the output shafts, which are preferably assigned to a motor vehicle drive axle. However, the differential gear set can also have the function of a longitudinal differential, which can be used to distribute the drive power to several drive axles. In addition, the differential gear set within the scope of the invention can also be designed as a planetary gear differential, a spur gear differential, etc.

In particular, the output shaft is coupled to an input element, which is preferably a differential basket of the differential gear set. When the differential gear set is used as a transverse differential and the motor vehicle transmission is installed transverse to the direction of travel of the associated motor vehicle, the output shaft is then preferably connected to the input element in a rotationally fixed manner. This is also realized in particular when the differential gear set functions as a longitudinal differential and the vehicle transmission is aligned in the direction of travel of the vehicle. If the vehicle transmission is installed in the direction of travel and the differential gear set is used as a transverse differential, the output shaft is coupled to the input element via a bevel drive. Such a bevel drive is also preferably used when the differential gear set is used as a longitudinal differential and the vehicle transmission is aligned transverse to the direction of travel.

According to one embodiment of the invention, the first planetary gear set and the second planetary gear set are arranged axially between a connection point of the drive shaft, which serves to couple the drive shaft to the at least one drive engine, and the third planetary gear set. This makes it possible to achieve a suitable structure for the motor vehicle transmission according to the invention. If shift elements of the vehicle transmission are combined to form a shifting device, this shifting device is arranged axially at least overlapping with the third planetary gear set and radially surrounding the third planetary gear set. This allows a compact arrangement to be realized. If a differential gear set is also part of the vehicle transmission, the shifting device also covers the differential gear set at least partially axially and is arranged radially around it. If the shift elements are designed as individual shift elements, they are also arranged at least partially axially overlapping with and radially surrounding the third planetary gear set and possibly the differential gear set.

Another object of the invention is a drive unit which, in addition to an electric machine, has a motor vehicle transmission according to one or more of the variants described above. A rotor of the electric motor is coupled to the drive shaft of the vehicle transmission. In the context of the invention, the electric machine can be operated as a generator on the one hand and as an electric motor on the other. This makes it possible to create a drive unit that is suitable for use in a motor vehicle in the form of an electric or hybrid vehicle.

The electric motor can be non-rotatably connected to the drive shaft of the vehicle transmission, wherein the electric motor is then arranged coaxially to the drive shaft. This means that the drive shaft and the rotor of the electric machine run at the same speed during operation. Alternatively, however, it is also conceivable that the rotor of the electric motor is connected to an intermediate shaft of the vehicle transmission in a rotationally fixed manner, which is coupled to the drive shaft via at least one transmission stage, so that the electric motor may then be axially offset to the drive shaft. Depending on the embodiment of the at least one transmission stage, a coaxial arrangement of the electric motor to the drive shaft is also possible.

A drive unit designed in accordance with one of the aforementioned variants is in particular part of an electrically drivable motor vehicle drive axle, which is intended for an electric or hybrid vehicle. Preferably, the vehicle transmission has a differential gear set which is coupled to the output shaft and couples the output shaft to output shafts. Each of the output shafts is assigned to a drive wheel of the vehicle drive axle.

Within the scope of the invention, a motor vehicle drive axle as described above is provided in a hybrid or electric vehicle, which may be a passenger car or a commercial vehicle. A commercial vehicle can be an at least partially electrically driven van or a light to medium-duty bus or truck.

BRIEF DESCRIPTION OF THE DRAWINGS

Advantageous embodiments of the invention, which is discussed in the following, is shown in the drawings. These show in:

FIG. 2 an exemplary wiring diagram of a motor vehicle transmission of the drive unit from FIG. 1;

FIG. 4 an exemplary wiring diagram of a motor vehicle transmission of the drive unit from FIG. 3;

FIG. 6 an exemplary wiring diagram of a motor vehicle transmission of the drive unit from FIG. 5; and FIG. 7 a schematic view of an electric vehicle according to a preferred embodiment of the invention.

DETAILED DESCRIPTION

Figure 1:
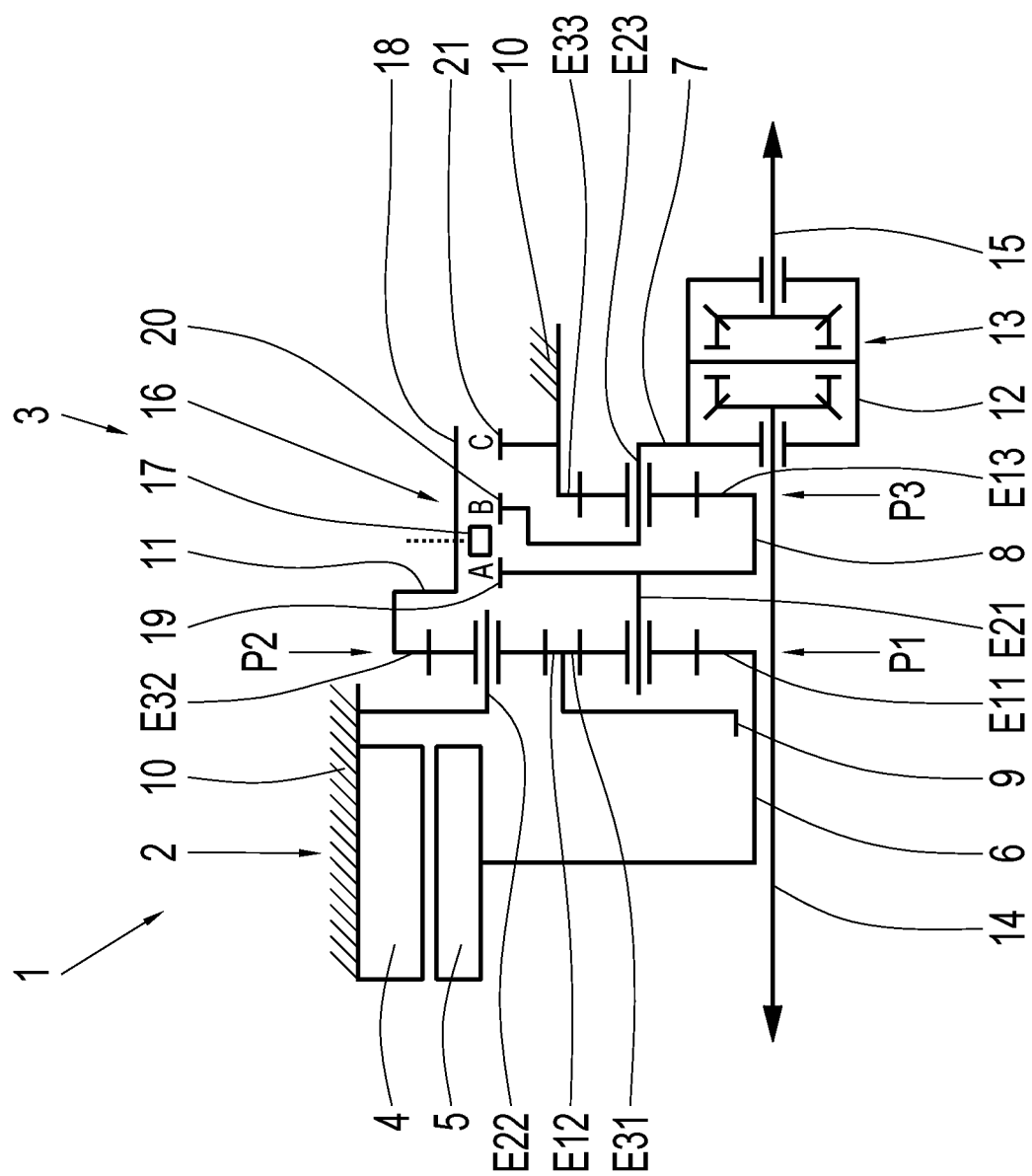
FIG. 1 a schematic view of a drive unit according to one embodiment of the invention.

FIG. 1 shows a schematic view of a drive unit 1, which is designed according to one embodiment of the invention. This drive unit 1 comprises an electric motor 2 and a motor vehicle transmission 3, which is designed in accordance with one possible embodiment of the invention. The electric machine 2 is formed by a stator 4 and a rotor 5 in a manner known in principle to the skilled person, wherein the electric machine 2 can be operated as a generator on the one hand and as an electric motor on the other.

In addition to a drive shaft 6 and an output shaft 7, the vehicle transmission 3 has three planetary gear sets P1, P2, and P3, each consisting of a first element E11 or E12 or E13, a second element E21 or E22 or E23 and a third element E31 or E32 or E33. The respective first element E11 or E12 or E13 of the respective planetary gear set P1 or P2 or P3 is a respective sun gear, while the respective second element E21 or E22 or E23 of the respective planetary gear set P1 or P2 or P3 is designed as a respective planet carrier. The respective third element E31 or E32 or E33 of the respective planetary gear set P1 or P2 or P3 is furthermore a respective ring gear of the respective planetary gear set P1 or P2 or P3.

In the respective planet carrier of the respective planet gear set P1 or P2 or P3, at least one planet gear is rotatably mounted in each case, which is in meshing engagement with both the respective sun gear and the respective ring gear of the respective planet gear set P1 or P2 or P3. The planetary gear sets P1, P2, and P3 are therefore designed here as minus planetary gear sets.

Within the scope of the invention, however, an embodiment of one or more of the planetary gear sets P1 to P3 as a plus planetary set is also possible, for which, in comparison to the respective embodiment as a minus planetary set, the respective second element E21 or E22 or E23 is to be formed by the respective ring gear and the respective third element E31 or E32 or E33 by the respective planet carrier. When the respective planetary gear set is designed as a plus planetary gear set, a stationary transmission ratio must furthermore be increased by one compared to an embodiment as a minus planetary gear set. In a plus planetary set, at least one pair of planet gears is rotatably mounted in the respective planet carrier, of which one planet gear meshes with the respective sun gear and one planet gear meshes with the respective ring gear. The planetary gears of the at least one planetary gear pair are also in mesh with one another.

In the present case, the first element E11 of the first planetary gear set P1 is non-rotatably connected to the drive shaft 6, which is also non-rotatably connected to the rotor 5 of the electric machine 2. In this respect, the first element E11 of the first planetary gear set P1 and the rotor 5 are also non-rotatably connected to each other via the drive shaft 6, as a result of which the first element E11 and the rotor 5 always rotate at the same speed. In the context of the invention, the drive shaft 6 can be formed in one piece with the rotor 5 of the electric machine 2 and/or with the first element E11 of the first planetary gear set P1.

The second element E21 of the first planetary gear set P1 is connected in a permanently rotationally fixed manner to the first element E13 of the third planetary gear set P3, so that these two elements E21 and E13 also constantly rotate at the same speed. This connection is made via a shaft 8, wherein the shaft 8 could be made in one piece with the second element E21 of the first planetary gear set P1 and/or with the first element E13 of the third planetary gear set P3.

Furthermore, the third element E31 of the first planetary gear set P1 and the first element E12 of the second planetary gear set P2 are permanently connected to one another in a rotationally fixed manner in that the third element E31 of the first planetary gear set P1 and the first element E12 of the second planetary gear set P2 are designed in one piece. For this purpose, the first planetary gear set P1 predominantly overlaps axially with the second planetary gear set P2 and is arranged radially on the inside of the second planetary gear set P2, whereby both the third element E31 of the first planetary gear set P1 and the first element E12 of the second planetary gear set P2 can be formed by a compact component. In particular, the ring gear forming the third element E31 is provided with an additional toothing on an outer circumference, via which the first element E12 of the second planetary gear set P2 is formed in the form of the associated sun gear. In particular, the first planetary gear set and the second planetary gear set are arranged axially in one plane. The elements E31 and E12, which are designed in one piece with each other, are also non-rotatably connected to a shaft 9, which is freely rotatably mounted.

As can also be seen in FIG. 1, the second element E22 of the second planetary gear set P2 is fixed to a permanently fixed component 10 and thus permanently prevented from rotating. The fixed component 10 is preferably a transmission housing of the motor vehicle transmission 3, a part of such a transmission housing or a component that is non-rotatably connected to it. The third element E33 of the third planetary gear set P3 is also permanently fixed to the fixed component 10, as a result of which the third element E33 is also permanently prevented from rotating. The second element E23 of the third planetary gear set P3, however, is non-rotatably connected to the output shaft 7 of the motor vehicle transmission 3, as a result of which the second element E23 of the third planetary gear set P3 permanently rotates together with the output shaft 7. The second element E23 of the third planetary gear set P3 and the output shaft 7 could also be designed in one piece. Finally, the third element E3 2 of the second planetary gear set P2 is non-rotatably connected to a shaft 11.

In addition to the second element E23 of the third planetary gear set P3, the output shaft 7 is also permanently connected to a differential cage 12 of a differential gear set 13 so that it cannot rotate. This differential gear set 13 is designed as a bevel gear differential, which divides a drive torque introduced into the differential cage 12 via the output shaft 7 to two output shafts 14 and 15 in a manner known in principle to the skilled person. The differential gear set 13 also enables speed differences between the output shafts 14 and 15.

Furthermore, the motor vehicle transmission 3 has a shifting device 16, in which a coupling element 17 in the form of a sliding sleeve is provided. The coupling element 17 is guided non-rotatably and axially displaceable on a toothing 18, which is non-rotatably connected to the shaft 11 and thus also to the third element E32 of the second planetary gear set P2. Axial displacements of the coupling element 17 on the toothing 18 can be carried out via a positioning actuator—not shown here—which is preferably designed as an electromechanical positioning actuator.

The coupling element 17 can be moved between three different shift positions via the positioning actuator, in each of which the coupling element 17 meshes with an associated toothing 19, 20, or 21. The toothing 19 is non-rotatably connected to the shaft 8, while the toothing 20 is non-rotatably connected to the output shaft 7. Furthermore, the toothing 21 is non-rotatably connected to the fixed component 10 and thus permanently fixed.

Figure 2:
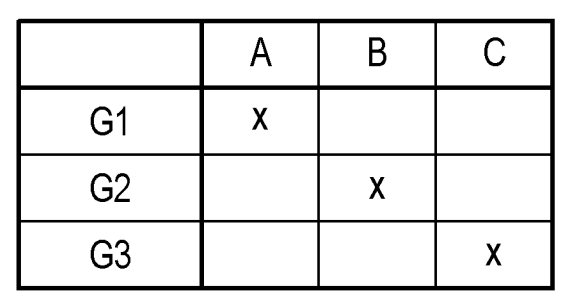

The shifting device 16 maps the function of three shift elements A, B, and C, each of whose actuated state is represented by the shifting device 19 in one of its shifting states. Thus, an actuated state of the shift element A is realized in a first shift position of the coupling element 17, in which the coupling element 17 engages in the toothing 19 and thus connects the shaft 11 to the shaft 8 in a rotationally fixed manner. Accordingly, this also results in a rotationally fixed connection of the third element E32 of the second planetary gear set P2 with the second element E21 of the first planetary gear set P1 and the first element E13 of the third planetary gear set P3. This also results in an opposite direction of rotation of the shaft 9 and a high transmission ratio from the drive shaft 6 to the output shaft 7. As can be seen in FIG. 2, which shows an exemplary gearshift diagram of the motor vehicle transmission 3 from FIG. 1, a first gear G1 is shifted by displaying the actuated state of the shift element A.

From the first shift position, the coupling element 17 can be moved via the positioning actuator into a first neutral position, in which the shaft 11 is not coupled via the coupling element 17. As a result, the drive shaft 6 is also decoupled from the output shaft 7, which also decouples the electric motor 2.

In addition to moving the coupling element 17 into the first shift position, the coupling element 17 can also be moved from the first neutral position into a second shift position, in which the coupling element 17 meshes with the toothing 20. As a result, the coupling element 17 connects the shaft 11 to the output shaft 7 in a rotationally fixed manner, whereby a lower, opposite direction of rotation of the shaft 9 and also a lower transmission ratio between the drive shaft 6 and the output shaft 7 is represented compared to the first shift position. This shows an actuated state of the shift element B, which, as shown in FIG. 2, means the shifting of a second gear G2 of the motor vehicle transmission 3.

On the one hand, the coupling element 17 can be moved from the second shift position into the first neutral position, or it can be moved in an axial direction opposite to this into a second neutral position, in which the shaft 11 is again not coupled via the coupling element 17 of the shifting device 16. This means that the drive shaft 6 is also decoupled from the output shaft 7 in the second neutral position.

From the second neutral position, the coupling element 17 can be moved to a third shift position, which corresponds to an actuated state of the shift element C. In this third shift position, meshing with the toothing 21 is then produced on the coupling element 17, whereby the coupling element 17 connects the shaft 11 to the stationary component 10 in a rotationally fixed manner. As a result, the shaft 11 and thus also the third element E32 of the second planetary gear set P2 is thus immobilized, which, due to the permanently fixed state of the second element E22 of the second planetary gear set P2, results in the second planetary gear set P2 being blocked and the complete second planetary gear set P2 being immobilized. As a result, the shaft 9 comes to a standstill, whereby the drive shaft 6 is coupled to the output shaft 7 via the first planetary gear set P1 and the third planetary gear set P3. As can be seen in FIG. 2, this shifts a third gear G3 of the vehicle transmission 3.

In the present case, the electric motor 2 is positioned coaxially to the motor vehicle transmission 3, in which the input shaft 6, the planetary gear sets P1 to P3, the output shaft 7, the output shafts 14 and 15, the differential gear set 13 and also the shafts 8, 9, and 11 are arranged coaxially to one another. The planetary gear sets P1 and P2, which lie at least essentially in one plane, are arranged axially between the electric motor 2 and the third planetary gear set P3, which is followed by the differential gear set 13 on a side facing away from the planetary gear sets P1 and P2. The shifting device 16 is arranged axially overlapping with the third planetary gear set P3 and the differential gear set 13 and radially surrounding them. While the output shafts 14 and 15 are designed as solid shafts, the input shaft 6, the output shaft 7 and the shafts 8, 9, and 11 are each designed as hollow shafts.

Figure 3:
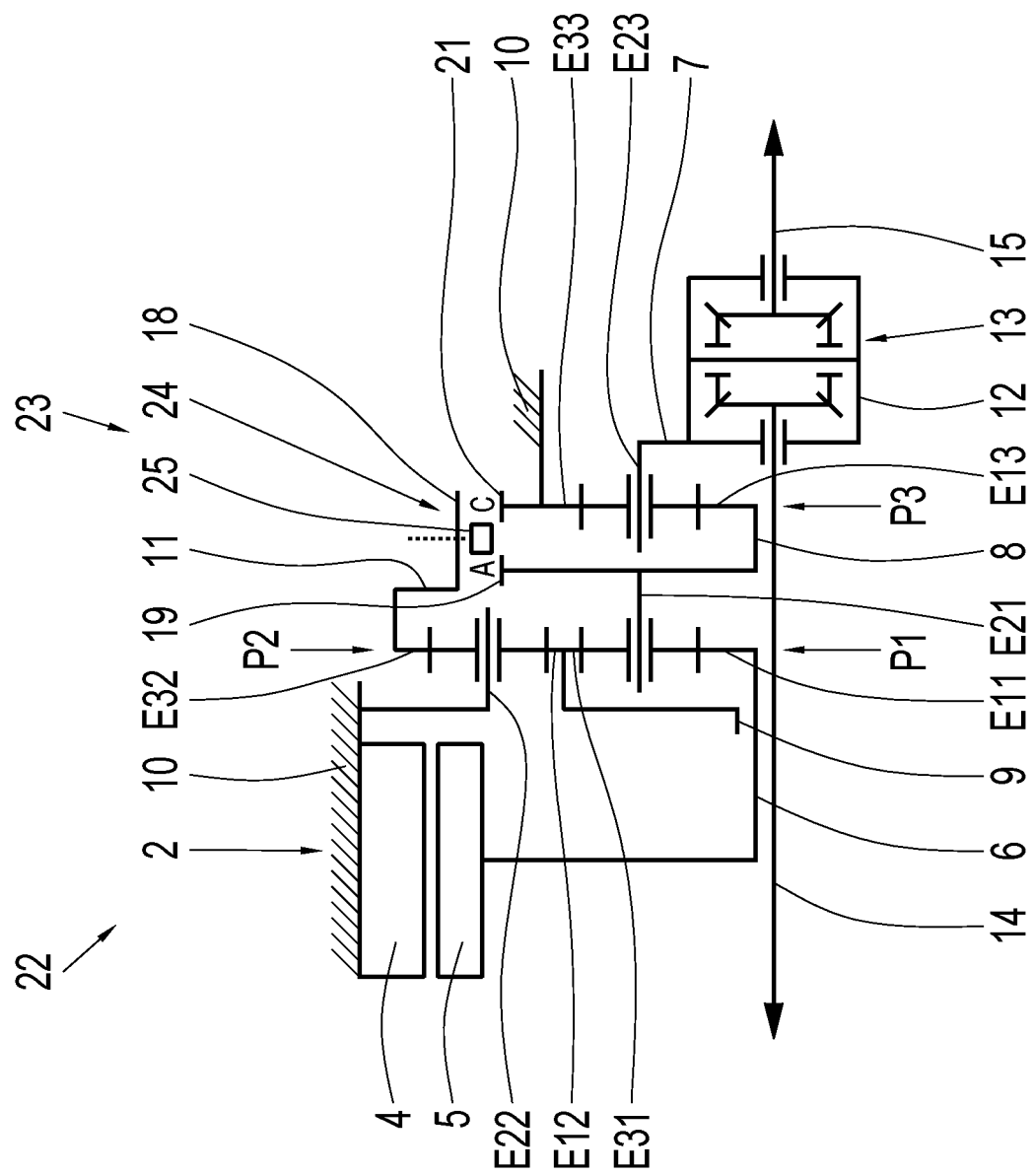
FIG. 3 a schematic representation of a drive unit according to a further embodiment of the invention.
Figure 4:
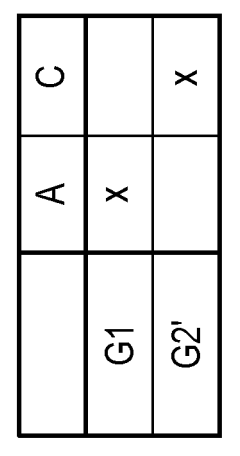

Furthermore, FIG. 3 shows a schematic representation of a drive unit 22, which is designed in accordance with a further possible embodiment of the invention and essentially corresponds to the drive unit 1 of FIG. 1. What is different here, however, is that a shifting device 24 is provided in a motor vehicle transmission 23 of the drive unit 22, in whose coupling element 25 only two shift positions can be realized in addition to a neutral position. The shifting device 24 only maps the function of two shift elements A and C. Thus, in a first shifting position of the coupling element 25, the actuated state of the shift element A is represented by meshing with the toothing 19, and in the second shift position of the coupling element 25, the actuated state of the shift element C is represented by meshing with the toothing 21. As a result, only two different gears G1 and G2' can be shifted in the vehicle transmission 23 shown in FIG. 3, as can be seen in FIG. 4. The first gear G1 is shown analogous to the variant shown in FIGS. 1 and 2, while the second gear G2' corresponds to the third gear G3 of the variant shown in FIGS. 1 and 2. However, a third gear cannot be shifted. Otherwise, the drive unit 22 corresponds to the drive unit 1 in FIGS. 1 and 2, so that reference is made to what is described here.

Figure 5:
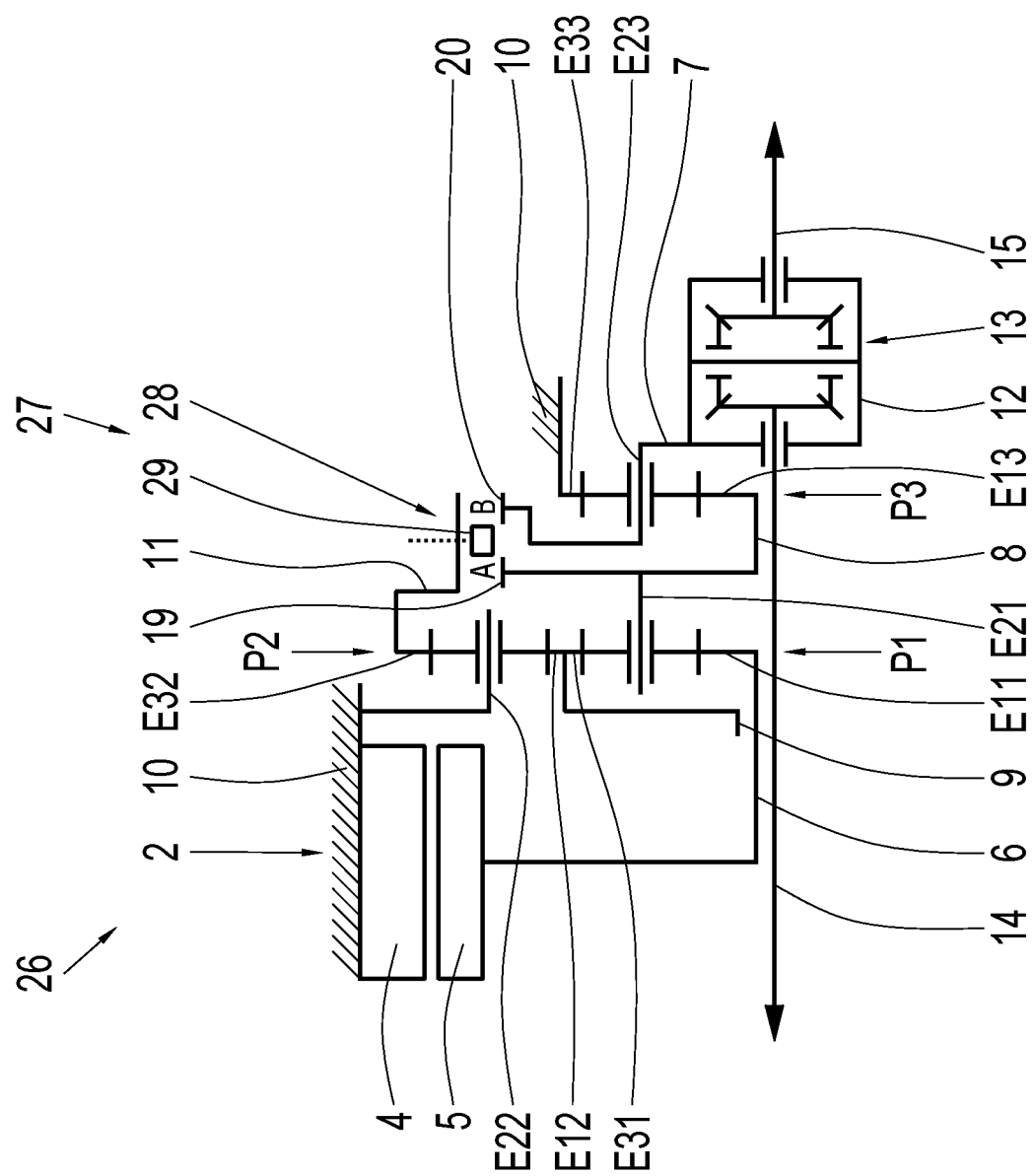
FIG. 5 a schematic view of a drive unit according to a further embodiment of the invention.
Figure 6:
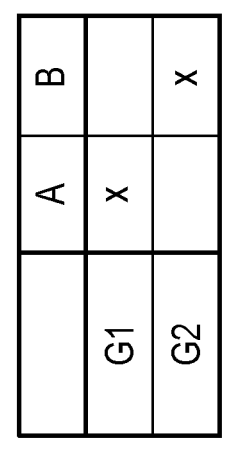

FIG. 5 shows a schematic view of a drive unit 26, which is designed according to a further embodiment of the invention. This drive unit 26 also essentially corresponds to the drive unit 1 of FIG. 1, wherein the drive unit 26 differs from the drive unit 1 in that a shifting device 28 is provided in a motor vehicle transmission 27 of the drive unit 26, in which only two shift positions of a coupling element 29 of the shifting device 28 can be displayed in addition to a neutral position. In the first shift position, the coupling element 29 meshes with the toothing 19, while in the second shift position the coupling element 29 engages with the toothing 20. Accordingly, only the shift elements A and B of the drive unit 26 are mapped by the shifting device 28. As a result, two different gears G1 and G2 can be shifted between the drive shaft 6 and the output shaft 7 in the vehicle transmission 27 of the drive unit 26, as can also be seen in FIG. 6. The two gears G1 and G2 correspond to the first gear G1 and the second gear G2 of the motor vehicle transmission 3 of the drive unit 1, although no third gear can now be selected. Otherwise, the drive unit 26 corresponds to the drive unit 1 in FIG. 1, so that reference is made to what is described here.

Finally, FIG. 7 shows a schematic view of an electric vehicle 30, which may in particular be an electric commercial vehicle, such as a van. In addition to a steerable, non-driven vehicle axle 31, the electric vehicle 30 also has a vehicle drive axle 32 with drive wheels 33 and 34. Part of the motor vehicle drive axle 32 is also a drive unit 35, which corresponds to one of the variants shown in FIGS. 1, 3 and 5. The drive wheel 33 is non-rotatably connected to the output shaft 14 of the drive unit 35, while the drive wheel 34 is non-rotatably connected to the output shaft 15 of the drive unit 35.

While the vehicle axle 31 is a front axle of the electric vehicle 30, the vehicle drive axle 32 is a rear axle of the electric vehicle 30. However, as an alternative or in addition to the vehicle drive axle 32, the vehicle axle 31 could also be designed as a driven axle, possibly with an analogous drive unit structure.

By means of the design according to the invention, a compact motor vehicle transmission with a suitable transmission ratio for the integration of an electric motor can be realized.

LIST OF REFERENCE NUMERALS

1 Drive unit
2 Electric machine
3 Motor vehicle transmission
4 Stator
5 Rotor
6 Input shaft
7 Output shaft
8 Shaft
9 Shaft
10 Fixed component
11 Shaft
12 Differential cage
13 Differential gear set
14 Pinion shaft
15 Output shaft
16 Shift device
17 Coupling element
18 Gearing
19 Gearing
20 Gearing
21 Gearing
22 Drive unit
23 Motor vehicle transmission
24 Shift device
25 Coupling element
26 Drive unit
27 Motor vehicle transmission
28 Shift device
29 Coupling element
30 Electric vehicle
31 Vehicle axle
32 Motor vehicle drive axle
33 Drive wheel
34 Drive wheel
35 Drive unit
P1 First planetary gear set
P2 Second planetary gear set
P3 Third planetary gear set
E11 First element first planetary gear set
E21 Second element first planetary gear set
E31 Third element first planetary gear set
E12 First element second planetary gear set
E22 Second element second planetary gear set
E32 Third element second planetary gear set
E13 First element third planetary gear set
E23 Second element third planetary gear set
E33 Third element third planetary gear set
A Shift element
B Shift element
C Shift element
G1 First gear
G2 Second gear
G2' Second gear
G3' Third gear

The invention claimed is:

1. A motor vehicle transmission for an at least partially electrically driven motor vehicle having an electrically drivable motor vehicle drive axle and at least one electric motor, the motor vehicle transmission comprising:
a drive shaft configured for coupling to the at least one electric motor;
an output shaft;
a first planetary gear set, a second planetary gear set, and a third planetary gear set, wherein the first planetary gear set, the second planetary gear set, and the third planetary gear set each comprise a first element, a second element, and a third element in the form of a sun gear, a planet carrier, and a ring gear, respectively, wherein:
the first planet gear set is placed axially at least overlapping with the second planet gear set and is arranged radially inside the second planet gear set,
wherein the first element of the first planetary gear set is non-rotatably connected to the drive shaft,
wherein the third element of the first planetary gear set and the first element of the second planetary gear set are non-rotatably connected to one another, and
wherein the second element of the second planetary gear set is fixed; and
a shift element at least functionally provided, the shift element having an actuated state in which the second element of the first planetary gear set is connected in a rotationally fixed manner to the third element of the second planetary gear set, the second element of the first planetary gear set and the first element of the third planetary gear set are connected to one another in a rotationally fixed manner, that the second element of the third planetary gear set is non-rotatably connected to the output shaft, and that the third element of the third planetary gear set is fixed.

2. The motor vehicle transmission according to claim 1, further comprising, at least functionally, a further shift element having an actuated state in which the third element of the second planetary gear set is brought into a rotationally fixed connection with the output shaft.

3. The motor vehicle transmission according to claim 2, wherein:
   the shift element and the further shift element are formed by a common shift device having a coupling element, the coupling element configured to be positioned in a first shift position and in a second shift position;
   in the first shift position the coupling element functionally represents an actuated state of the shift element and connects the third element of the second planetary gear set in a rotationally fixed manner to the second element of the first planetary gear set and the first element of the third planetary gear set; and
   in the second shift position the coupling element functionally represents an actuated state of the further shift element and connects the third element of the second planetary gear set in a rotationally fixed manner to the output shaft.

4. The motor vehicle transmission according to claim 2, further comprising, at least functionally, an additional shift element having an actuated state in which two of the elements of the second planetary gear set are connected to one another in a rotationally fixed manner.

5. The motor vehicle transmission according to claim 4, wherein in the actuated state of the additional shift element, the third element of the second planetary gear set is directly fixed.

6. The motor vehicle transmission according to claim 5, wherein:
   the shift element and the additional shift element are formed by a common shifting device having a coupling element that is configured to be positioned in a first shift position and in a second shift position,
   in the first shift position, the coupling element functionally represents the actuated state of the shift element and connects the third element of the second planetary gear set in a rotationally fixed manner to the second element of the first planetary gear set and to the first element of the third planetary gear set; and
   in the second shift position the coupling element functionally represents the actuated state of the additional shift element and fixes the third element of the second planetary gear set.

7. The motor vehicle transmission according to claim 5, wherein:
   the shift element, the further shift element, and the additional shift element are formed by a common shift device having a coupling element, the coupling element configured to be positioned in a first shift position, in a second shift position, and in a third shift position;
   in the first shift position the coupling element functionally represents the actuated state of the shift element and connects the third element of the second planetary gear set in a rotationally fixed manner to the second element of the first planetary gear set and the first element of the third planetary gear set;
   in the second shift position the coupling element functionally represents the actuated state of the additional shift element and brings the third element of the second planetary gear set and the output shaft into rotationally fixed connection with one another; and
   in the third shift position the coupling element functionally represents the actuated state of the additional shift element and fixes the third element of the second planetary gear set.

8. The motor vehicle transmission according to claim 4, wherein:
   the shift element, the further shift element, and the additional shift element are formed by a common shift device having a coupling element, the coupling element configured to be positioned in a first shift position, in a second shift position, and in a third shift position;
   in the first shift position the coupling element functionally represents the actuated state of the shift element and connects the third element of the second planetary gear set in a rotationally fixed manner to the second element of the first planetary gear set and the first element of the third planetary gear set;
   in the second shift position the coupling element functionally represents the actuated state of the additional shift element and brings the third element of the second planetary gear set and the output shaft into rotationally fixed connection with one another; and
   in the third shift position the coupling element functionally represents the actuated state of the additional shift element and fixes the third element of the second planetary gear set.

9. The motor vehicle transmission according to claim 1, wherein the third element of the first planetary gear set is one piece with the first element of the second planetary gear set.

10. The motor vehicle transmission according to claim 1, further comprising:
    a differential gear set coupling the output shaft to the two output shafts, wherein the output shaft is coupled to a differential gear set.

11. The motor vehicle transmission according to claim 1, wherein the first planetary gear set and the second planetary gear set are arranged axially between a connection point of the drive shaft, which serves to couple the drive shaft to the at least one electric motor and the third planetary gear set.

12. The motor vehicle transmission according to claim 11, wherein the shifting device is arranged axially at least overlapping with the third planetary gear set and is placed radially surrounding the third planetary gear set.

13. A drive unit for an at least partially electrically driven motor vehicle, comprising:
    an electric machine with a rotor; and
    the motor vehicle transmission according to claim 1, wherein the rotor of the electric machine is coupled to the drive shaft of the motor vehicle transmission.

14. A drive unit according to claim 13, wherein the rotor is arranged coaxially to the drive shaft and is non-rotatably connected to the drive shaft.

15. An electrically driven motor vehicle drive axle for an at least partially electrically driven motor vehicle, comprising:
    a drive unit comprising:
        an electric machine with a rotor, and the motor vehicle transmission according to claim 1, wherein the rotor of the electric machine is coupled to the drive shaft of the motor vehicle transmission.

16. A hybrid or electric vehicle comprising
a drive unit comprising:
an motor vehicle transmission according to claim 1, wherein the rotor of the electric machine is coupld to the drive shaft of the motor vehicle transmission.

17. A method of operating a motor vehicle transmission, the method comprising:
providing the motor vehicle transmission according to claim 1; and
shifting a first gear between the drive shaft and the output shaft by representing the actuated state of the shift element.

18. The method according to claim 17 and for operating a motor vehicle transmission wherein providing the motor vehicle transmission includes providing, at least functionally, a further shift element having an actuated state in which the third element of the second planetary gear set is brought into a rotationally fixed connection with the output shaft, and wherein the method further comprises:

shifting a second gear between the drive shaft and the output shaft by representing the actuated state of the further shift element.

19. The method according to claim 17, wherein providing the motor vehicle transmission includes providing, at least functionally, an additional shift element having an actuated state, and wherein the method comprises shifting a second gear between the drive shaft and the output shaft by representing the actuated state of the additional shift element.

20. The method according to claim 17, wherein providing the motor vehicle transmission includes providing, at least functionally, an additional shift element having an actuated state, and wherein the method comprises:
shifting a second gear between the drive shaft and the output shaft by representing the actuated state of the additional shift element; and
shifting a third gear between the drive shaft and the output shaft by representing the actuated state of the additional shift element.

* * * * *